United States Patent [19]

Yourman

[11] 3,889,003
[45] June 10, 1975

[54] BAKED PRODUCT AND PROCESS FOR PREPARING SAME

[76] Inventor: Maxine N. Yourman, 49 Potomac Ln., Sayville, N.Y. 11782

[22] Filed: June 25, 1973

[21] Appl. No.: 372,909

[52] U.S. Cl.............. 426/580; 426/614; 426/660; 426/804
[51] Int. Cl............................................. A23c 9/00
[58] Field of Search .......... 426/152, 159, 156, 343, 426/73, 342, 348

[56] References Cited
UNITED STATES PATENTS

| | | |
|---|---|---|
| 2,776,893 | 1/1957 | Finucanen .......................... 426/159 |
| 3,567,461 | 3/1971 | Wernecke........................... 426/152 |
| 3,574,634 | 3/1971 | Singer................................. 426/152 X |
| 3,615,658 | 10/1971 | Glabe............................... 426/343 X |
| 3,676,150 | 7/1972 | Glicksman et al................. 426/152 |

*Primary Examiner*—Raymond N. Jones
*Attorney, Agent, or Firm*—Stephen E. Feldman

[57] ABSTRACT

A low carbohydrate, high protein, baked product containing eggs, powdered milk, dextrin, artificial sweetner, water and flavoring. The composition rises and has the consistency of baked products such as cake, yet there is very little carbohydrate present and no flour, sugar, salt, shortening, leavening, starch or yeast present.

6 Claims, No Drawings

BAKED PRODUCT AND PROCESS FOR PREPARING SAME

BACKGROUND OF THE INVENTION

This invention relates to low calorie, low sugar, low carbohydrate dietetic cakes having high protein and particularly a cake that rises and has the same consistency, body, texture and taste as a conventional baked product, such as a cake.

It is quite common for many adults and other persons to have to restrict their intake of salt, carbohydrates, such as sugar, starches and flour, and thus there is a great incentive to produce baked products not having these ingredients. The desire is to produce foods which have the qualities of the conventional products but lack these ingredients, especially the carbohydrates, such as the flour.

Along this line, there have been many attempts to produce cakes which lack some or all of these ingredients; however, these attempts have invariably met with failure since the cakes either did not rise properly, did not stay risen, or did not have the appearance, taste and/or consistency of conventional cakes. One of the basic problems was in providing the proper texture and consistency.

In the prior art, dextrin type compounds were substituted for sugar; however, there was always resort to starches shortenings and flour ingredients to achieve the desired results. For example, in U.S. Pat. No. 2,210,857, the use of dextrin instead of sugar is specifically mentioned; however, it is always combined with flour or flour and shortening.

In a like manner, in U.S. Pat. No. 2,776,983, dextrin is used, however, flour is also used to produce a cake. In U.S. Pat. No. 2,876,106, diabetic cakes containing polyose, a dextrin sweetner and saccharin are described; however, as in the previous cases, when a cake is produced, flour and shortening are used. Thus, various attempts in producing compositions which would have the same composition, texture and appearance of conventional cakes and would act as substitutes for them, were not successful. Moreover, they invariably, such as with the prior art examples previously mentioned, resorted to the use of flour and other ingredients which are not desirable in low calorie, diabetic cake compositions. Flour is an especially undesirable ingredient since it is high in carbohydrates and low in protein, and thereby undesirable in dietetic diets.

There have also been conventional type cakes which are thought of as low calorie cakes, such as angel food and sponge cakes, however, even these cakes required flour. For example, in the Boston Cooking School Cookbook of Fanny Farmer, 1920, page 502, the formula for a conventional sponge cake, while not containing a leavening agent, does contain flour. In a like manner, in the Meta Gibbons Modern Encyclopedia of Cooking, 1947, Volume I pages 547–548, recipes given for true sponge cakes and true angel food cakes contain flour.

Thus, the desire is to produce a cake-like composition having no flour, no sugar, and very little carbohydrate, no shortening, no salt, no leavening, no starch or yeast and having the appearance, texture and rising quality and consistency of a conventional baked product, such as a cake.

SUMMARY OF THE INVENTION

A low calorie dietetic cake having basically eggs, milk powder and dextrin. The eggs, milk and dextrin combine to form a binding agent which when combined with other ingredients result in a baked product that has the appearance, texture and taste of a conventional cake. Suitable flavoring agents, and fruit sugars or other artificial or natural sweetners may be added. Significantly, there is little carbohydrate and no flour carbohydrate in the composition. There is also no salt, shortening, leavening starch or yeast added.

The object of this invention is to produce a high protein, lowe carbohydrate, low calorie, dietetic cake having no flour, sugar, salt, shortening, leavening, starch or yeast.

PREFERRED EMBODIMENT OF THE INVENTION

This invention relates to baked compositions, such as cakes, and especially compositions for dietetic, diabetic, low sugar, low carbohydrate, low calorie and high protein diets. The composition includes the following basic ingredients: eggs, skim milk powder, dextrin, ice water and flavoring.

The white and/or yolk of the eggs are added to add sufficient elasticity and binder when combined with the powdered milk to result in a composition that has the same texture, composition and bulk as a conventional cake baked product, even though no flour, shortening or leavening is used.

The beaten eggs, especially the whites produce a rising type composition. Skim milk powder which contains casein (a protein) which, when added to the beaten eggs, stabilizes the egg whites, and holds them in the risen condition. The casein also acts as a binder to hold the composition together. The egg whites contain albumin, a protein which coagulates in the heat of an oven to stabilize and bind the composition together. The egg yolk contains vitellin, another protein, a globulin, which also coagulates in the oven to bind the composition together. The addition of the small amount of non-flour type carbohydrates (sucrose, fructose, levulose, dextrin or pectin) with the milk powder to the composition keeps it in the risen condition and forms the crumb like composition. These ingredients yield a baked product, such as a cake having the consistency, rising and binding properties of a conventional baked product. Milk powder significantly maintains the product in the risen condition.

The basic ingredients appear to be the natural sugar or dextrin (the non-flour carbohydrate) and the powdered milk that is added to the composition. These ingredients hold the composition together — act as a binder and give the final composition the necessary elasticity so that it will hold together and still have the consistency of a baked product (a bread or cake).

It will be appreciated that the baked product has the normal resiliency and rising properties even though no flour type carbohydrate is used. With conventional cakes and breads, flour must be provided to obtain these properties.

EXAMPLE I

In one example of the present invention, the following ingredients are used and combined as follows:
  14 ⅔ ozs. eggs
  32 ozs. skim milk powder 5 ⅓ ozs. Pillsbury Sprinkle Sweet
4 ozs. ice water
⅓ oz. grated orange rind
⅓ oz. vanilla flavor.

The Pillsbury Sweetner, according to the label, contains dextrins, and sodium saccharin and is known by the trademark "Sprinkle Sweet." The ingredients are combined in the following manner. The whites and yolks of the eggs are separated. The whites are then beaten while the ice water and almost half of the total Pillsbury Sweetner is gradually added during this beating process. Once the egg whites are stiff, the milk powder is gradually added to the combination while it is still being beaten. All the milk is added except for one tablespoon. The remaining sweetner is added to the yolks along with the vanilla and orange rind and then they are beaten until the yolks are thick. The egg yolk mixture is then folded into the whites and poured into an ungreased pan. The tablespoon of milk remaining is placed into the pan before cooking. The cake is baked at 325°F for 50 minutes or at 300°F for 50 minutes and 325°F for the last 10 minutes. The latter seems to result in a more even, consistent product with less burning or hardening of the surface crust.

In mixing the above ingredients, the combination of the whites, the dextrin and milk, when beaten and baked in the above manner, results in a cake that rises in the normal manner and stays risen so that it has the same bulk and consistency as a conventional cake.

Instead of the "Sprinkle Sweet" dextrin can be added alone, however, the resulting cake mixture tends to lack sweetness. In that case, levulose, sucrose or other simple sugars such as fruit sugars can be added with the dextrin instead of the sodium saccharin with substantially the same result. These natural fruit sugars seem to provide better texture.

The most important ingredients seem to be the combination of dextrin, milk and eggs. When these are combined as previously mentioned, the dextrin and milk act as a binding and bulking agent so that no flour is needed. This combination, without the use of flour has not been previously used to produce a cake. It is also noted that increasing the milk produces a heavy dry product, while reducing the milk produces a very light, moist product, however, this latter product has insufficient body.

EXAMPLE II

Example I is repeated except that no egg yolk is used. This results in an angel food cake type composition.

EXAMPLE III

Example I is repeated with the addition of 3 ozs. levulose (honey, molasses, maple syrup or fructose) combined with the dextrin. This produces a light, high, and moist product, a well textured product.

EXAMPLE IV

Example III is repeated except that no egg yolk is used. This results in an angel food cake type composition.

EXAMPLE V

Example I is repeated except that no orange rind or vanilla flavor is added. This results in a bread product.

EXAMPLE VI

Example I is repeated except that 5⅓ ozs. of Alberto Culver Sugar Twin, which contains dextrin, calcium saccharin, and calcium chloride is added instead of the Pillsbury Sweetner with substantially the same results.

EXAMPLE VII

Example I is repeated except that 1 oz. Sweet 'n Low, which contains lactose, and saccharin, plus two medium sized apples (which contain pectin and fructose) is added instead of the Pillsbury Sweetner with substantially the same results.

EXAMPLE VIII

Example I is repeated except that 3 ozs. of dextrin are added instead of the Pillsbury Sweetner with substantially the same results.

EXAMPLE IX

Example I is repeated except that 3 ozs. of honey is added instead of Pillsbury Sweetner with substantially the same results. Organic honey was used.

EXAMPLE X

Example I is repeated except that 6 ozs. of Fleichmann's Egg Beaters is added instead of the egg holks and 4 ozs. of the total skim milk powder is added to the Egg Beaters at this point to thicken the consistency of the Egg Beaters. The ingredients of the Egg Beaters is as follows: Non-fat dry milk, emulsifiers (vegetable lecithin, mono and propylene glycol monosterate cellulose), diglycerides and xanthan gums, trisodium and triethyl citrate, artificial flavor, aluminum sulfate, iron phosphate, artificial color, thiamin, riboflavin, and vitamin D.

EXAMPLE XI

Example I is repeated except that instead of the egg white, and the 4 ozs. of ice water, the following ingredients are added in the following manner:
¼ oz. unflavored gelatin
4 ozs. non fat dry milk
2 ozs. ice water
1 oz. water
1 oz. lemon juice
2 ozs. of Pillsbury Sweetner (this amount of Sweetner is in addition to the 5 ⅓ ozs. that are added later in the process).

The gelatin is soaked in the 1 oz. of water to soften it and then dissolved over hot water. The remaining ingredients are combined in the small bowl of an electric mixer at high speed for about 5 minutes. The dissolved gelatin is then added gradually with mixer continuing to run until the mixture stands and peaks in the same manner as stiffened egg whites. The remainder of the process is the same as Example I with substantially the same results.

It will be appreciated that the above composition results in a cake that rises and stays risen and has the normal texture, consistency, shape and otherwise outward appearance of a normal cake. It also tastes like a cake, cuts and breaks in the same manner as a cake, and has the feel of a cake. This is far different from anything that existed in the prior art. Also, significantly, there is no flour, shortening or starches added, since in the prior art, to achieve a cake; flour, starch and/or leavening had to be added.

Thus, a low caloric, high protein, non-flour carbohydrate dietetic baked product has been developed which results in a conventionally appearing cake lacking the undesirable ingredients for people on restricted diets.

While specific embodiments have been described, it will be appreciated that many modifications thereof may be made by one skilled in the art which falls within the true spirit and scope of the invention.

I claim:

1. The process of making a baked product consisting essentially of skim milk powder, egg white, egg yolk and dextrin comprising the steps of beating the whites of eggs which are separated from the yolks until they are stiff
   gradually adding ice water and dextrin and sweetner to the whites while beating the whites
   adding skim milk powder to the whites while they are being beaten
   beating the yolks with dextrin and sweetner and flavoring until the yolks are thick
   folding the egg mixture into the egg white mixture
   pouring the ingredients into an ungreased pan, and
   baking the composition at between 300°–325°F for between 50 and 60 minutes, the egg whites being in an amount sufficient to produce a rising type composition, the skim milk powder being in an amount sufficient to stabilize the egg white and hold them in the risen condition, and the dextrin being in a sufficient amount that when added to the egg white and baked, results in a baked product that rises and stays risen so that it has bulk and consistency.

2. The process of claim 1 including the steps of adding grated orange rind and vanilla flavoring prior to baking.

3. The process of claim 2 wherein the sweetner comprises sodium saccharin and dextrin.

4. The process of claim 2 wherein the sweetner comprises fruit sugar.

5. The product of the process of claim 2.

6. The product of the process of claim 1.

* * * * *

UNITED STATES PATENT OFFICE
CERTIFICATE OF CORRECTION

Patent No. 3,889,003      Dated June 10, 1975

Inventor(s) Maxine N. Yourman

It is certified that error appears in the above-identified patent and that said Letters Patent are hereby corrected as shown below:

Column 2, line 14, "lowe" should read -low-.

Column 4, line 28 "holks" should read -yolks-.

*Signed and Sealed this*

*second* Day of *September 1975*

[SEAL]

Attest:

RUTH C. MASON
*Attesting Officer*

C. MARSHALL DANN
*Commissioner of Patents and Trademarks*